(12) United States Patent
Nacer et al.

(10) Patent No.: US 10,219,283 B2
(45) Date of Patent: *Feb. 26, 2019

(54) NETWORK DEVICE BASED CONTROL OF A COVERAGE ENHANCEMENT MODE

(71) Applicant: Verizon Patent and Licensing Inc., Arlington, VA (US)

(72) Inventors: Jeremy Nacer, Morris Plains, NJ (US); Siva Sandeep Dhandu, Princeton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/891,121

(22) Filed: Feb. 7, 2018

(65) Prior Publication Data

US 2018/0167947 A1    Jun. 14, 2018

Related U.S. Application Data

(63) Continuation of application No. 15/227,381, filed on Aug. 3, 2016, now Pat. No. 9,967,889.

(51) Int. Cl.
| | |
|---|---|
| *H04W 72/00* | (2009.01) |
| *H04W 72/08* | (2009.01) |
| *H04W 74/06* | (2009.01) |
| *H04W 24/08* | (2009.01) |
| *H04L 1/18* | (2006.01) |
| *H04W 84/12* | (2009.01) |
| *H04W 88/08* | (2009.01) |
| *H04W 88/02* | (2009.01) |

(52) U.S. Cl.
CPC ............... *H04W 72/08* (2013.01); *H04L 1/18* (2013.01); *H04W 24/08* (2013.01); *H04W 74/06* (2013.01); *H04W 84/12* (2013.01); *H04W 88/02* (2013.01); *H04W 88/08* (2013.01)

(58) Field of Classification Search
CPC ..... H04W 72/08; H04W 74/06; H04W 24/08; H04W 84/12; H04W 88/08; H04W 88/02
USPC ....................................................... 455/452.2
See application file for complete search history.

(56) References Cited

U.S. PATENT DOCUMENTS

| 9,967,889 | B2* | 5/2018 | Nacer | ........................ H04L 1/18 |
| 2013/0159407 | A1 | 6/2013 | Koskela | |
| 2017/0013570 | A1 | 1/2017 | Vajapeyam | |
| 2018/0034736 | A1* | 2/2018 | Anchan | ................... H04L 47/14 |

* cited by examiner

*Primary Examiner* — Amancio Gonzalez

(57) ABSTRACT

A device may detect a trigger to configure a coverage enhancement mode for a wireless device. The wireless device may be associated with a particular coverage area. The device may determine information associated with one or more wireless devices connected to a network. The network may be associated with the particular coverage area. The information may be associated with a level of network traffic of the network. The device may determine a level of coverage enhancement for the wireless device based on the information associated with the one or more wireless devices connected to the network. The device may transmit an instruction to cause the wireless device to utilize the level of coverage enhancement for the coverage enhancement mode.

20 Claims, 10 Drawing Sheets

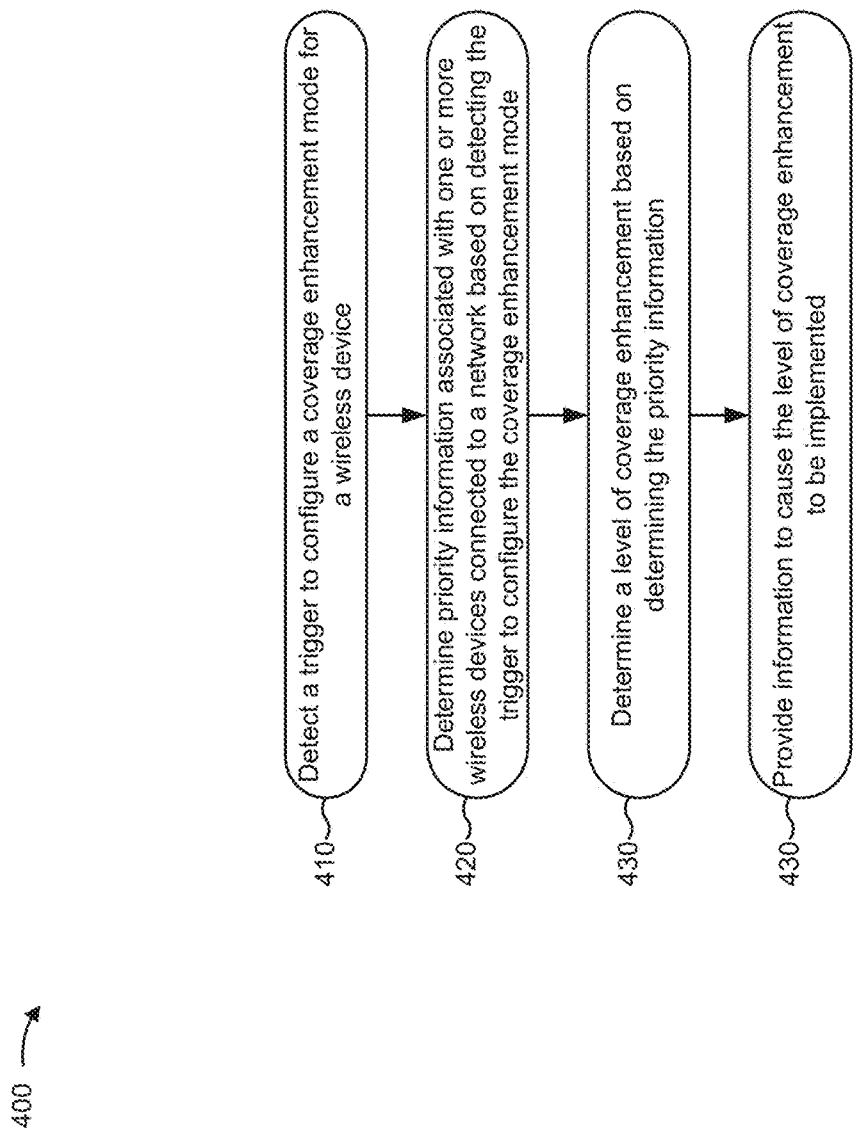

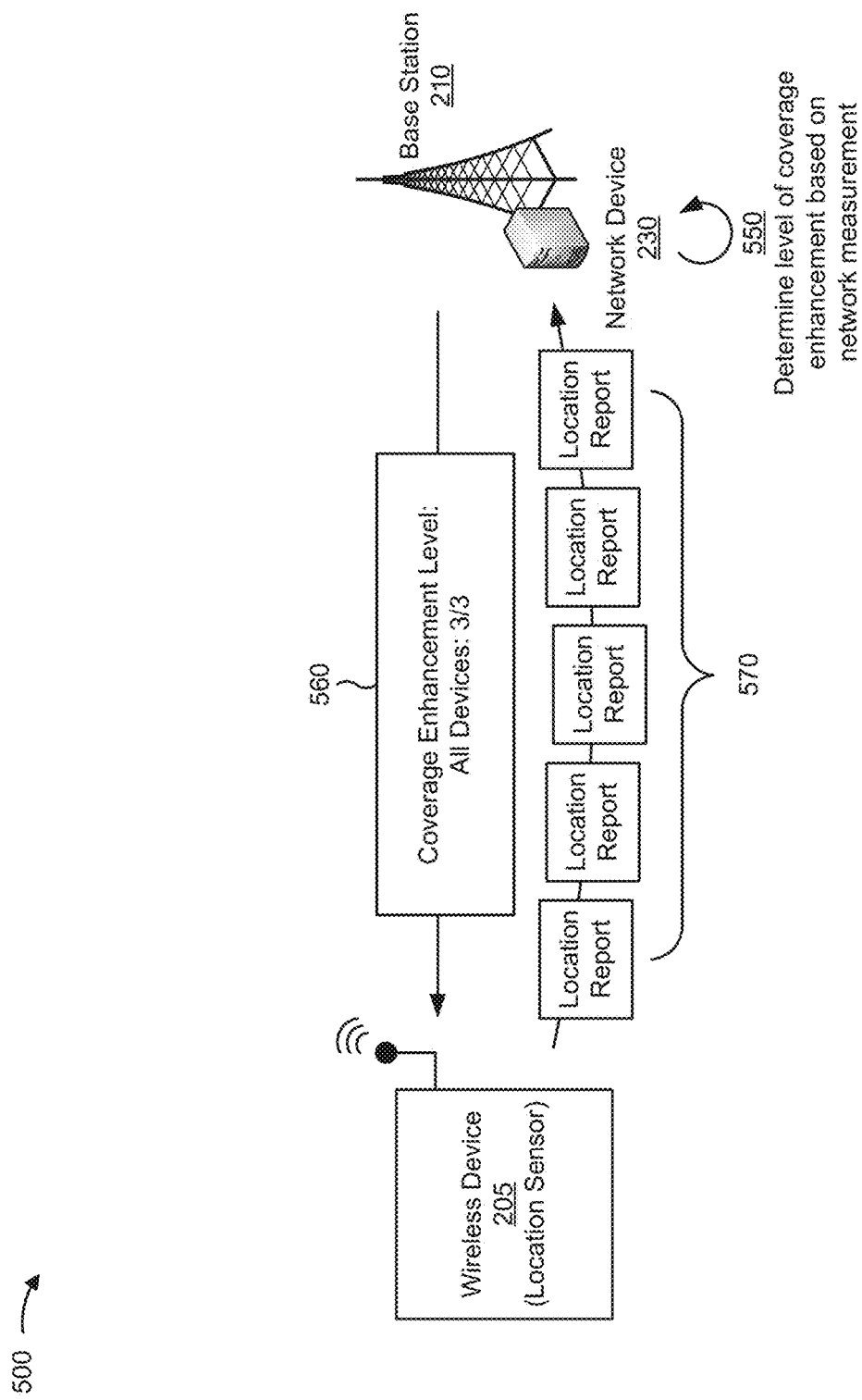

NETWORK DEVICE BASED CONTROL OF A COVERAGE ENHANCEMENT MODE

RELATED APPLICATION

This application is a continuation of U.S. patent application Ser. No. 15/227,381, filed Aug. 3, 2016, which is incorporated herein by reference.

BACKGROUND

An access point of a network may provide network coverage to allow one or more wireless devices to communicate via the network. For example, a wireless device (e.g., an Internet of Things device or a user device) may communicate with a destination device (e.g., a server, a control device, or a monitoring device) via the network. The wireless device may determine that a signal strength associated with the network fails to satisfy a threshold, and may duplicate a portion of a transmission to reduce a likelihood that the portion of the transmission will fail to be received by a base station as a result of poor network coverage associated with the signal strength failing to satisfy the threshold. For example, the wireless device may transmit multiple copies of a packet to increase a likelihood that at least one copy of the packet is received by the base station and provided to the destination device.

BRIEF DESCRIPTION OF THE DRAWINGS

FIG. 4 is a flow chart of an example process for configuring a coverage enhancement mode for a wireless device;

FIGS. 5A-5C are diagrams of an example implementation relating to the example process shown in FIG. 4.

DETAILED DESCRIPTION OF PREFERRED EMBODIMENTS

Figure 1:
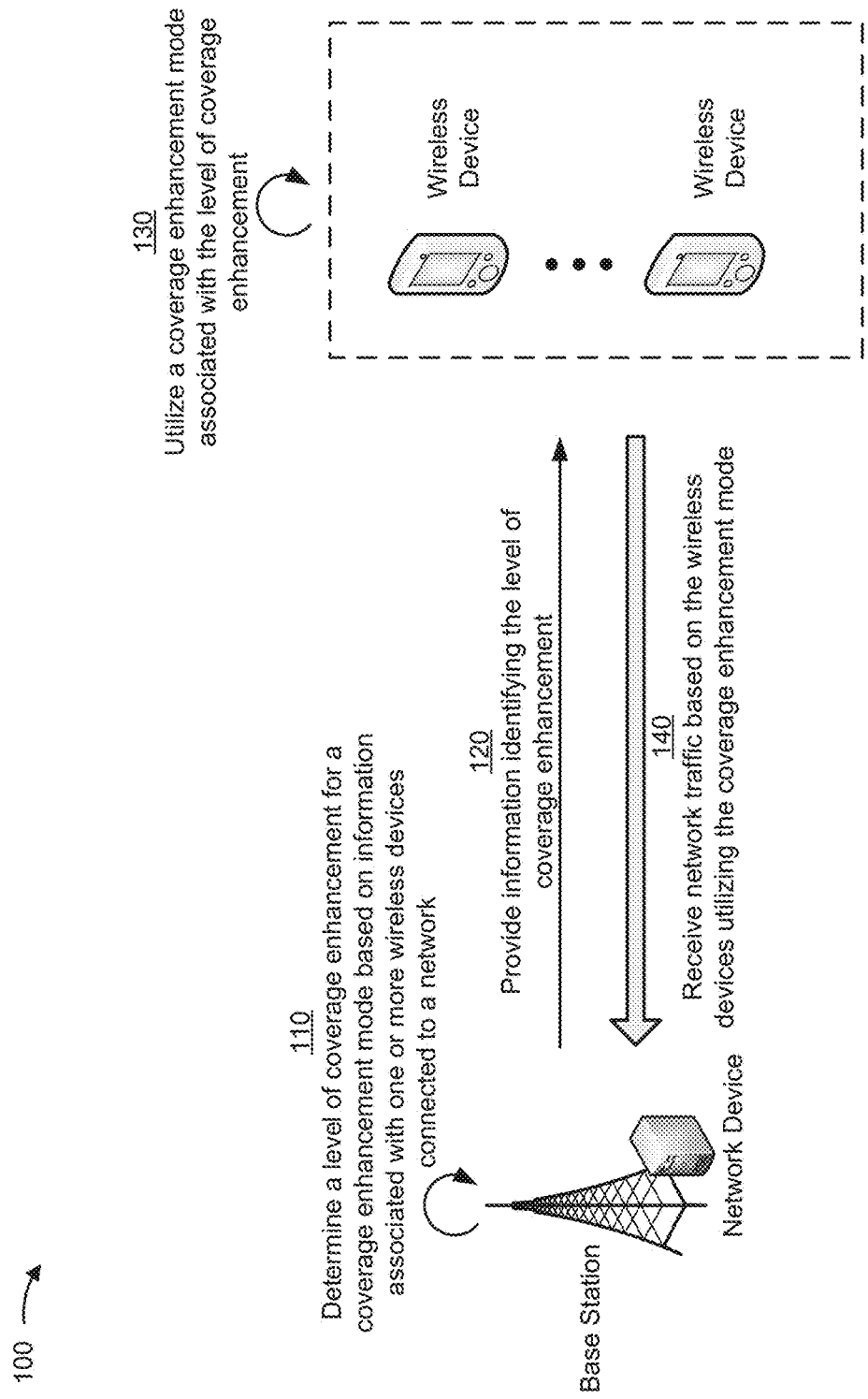
FIG. 1 is a diagram of an overview of an example implementation described herein.

The following detailed description of example implementations refers to the accompanying drawings. The same reference numbers in different drawings may identify the same or similar elements.

A signal strength associated with a network may vary based on a location of a wireless device relative to an access point (e.g., a base station). For example, a signal strength associated with a network may be relatively strong (e.g., the signal strength may satisfy a threshold) near a base station and relatively weak (e.g., the signal strength may fail to satisfy the threshold) farther from the base station. Similarly, the network may be associated with a relatively weak signal strength at a remote location, inside a building, or the like. The wireless device may experience dropped calls, lost packets, or ineffective attempts to connect to the network when utilizing a network for which network coverage is poor, such as a network for which the signal strength is relatively weak, a network to which a threshold quantity of wireless devices are connected, a network associated with a congestion condition, or the like. For example, when the wireless device is being utilized at a remote location, the wireless device may transmit network traffic to the base station, but the base station may fail to receive the network traffic. Similarly, when the wireless device is being utilized at a particular location, such as a stadium, and a threshold quantity of other wireless devices are also being utilized at the particular location, packets transmitted by the wireless device may be dropped.

When the wireless device determines that the network coverage is poor, such as when a signal strength associated with the network fails to satisfy a threshold, the wireless device may utilize a coverage enhancement mode. For example, the wireless device may cause one or more duplicates of a transmission to be transmitted. In this case, the wireless device may transmit multiple copies of each packet of a set of packets of the transmission. In this way, the wireless device may increase a likelihood that at least one copy of each packet of the set of packets of the transmission is received relative to when the wireless device is not utilizing a coverage enhancement mode. However, when multiple wireless devices each transmit multiple copies of multiple transmissions, the network may enter a congestion condition or may have a congestion condition exacerbated. Moreover, a particular wireless device may utilize excess network resources of the network, thereby negatively impacting user experience, wireless device performance, network performance, or the like for one or more other wireless devices connected to the network or attempting to connect to the network. Furthermore, a base station may be required to utilize excess processing resources to process the multiple copies of the multiple transmissions.

Implementations, described herein, may perform network device based control of the coverage enhancement mode. Based on centralizing control of the coverage enhancement mode, the network device reduces a likelihood that an excess quantity of wireless devices utilize the coverage enhancement mode and cause excess network traffic relative to permitting each wireless device to separately determine to use the coverage enhancement mode regardless of overall network conditions. Moreover, the network device may utilize prioritization information regarding a set of wireless devices connected to a network, thereby increasing a likelihood that a high priority wireless device, such as a wireless device utilized by emergency management personnel, is able to transmit information via the network. As a result, the wireless device improves network performance relative to permitting distributed control of the coverage enhancement mode by each wireless device of the network. Furthermore, the network device reduces a utilization of processing resources by the base station to process the network traffic relative to permitting excess quantities of duplicate packets to be transmitted to the base station for processing.

FIG. 1 is a diagram of an overview of an example implementation 100 described herein. As shown in FIG. 1, example implementation 100 may include one or more wireless devices, a base station, and a network device.

As further shown in FIG. 1, and by reference number 110, the network device may determine a level of coverage enhancement for a coverage enhancement mode based on information associated with the one or more wireless devices. For example, based on receiving a request to enter the coverage enhancement mode from the one or more wireless devices, the network device may determine a class of service for the one or more wireless devices, and may determine a particular level of coverage enhancement for the one or more wireless devices based on the class of service. In this case, the network device may determine a relatively high level of coverage enhancement (e.g., a relatively large quantity of duplicates of a transmission) for a first wireless device with a relatively high class of service (e.g., a network-connected smoke detector) and a relatively low level of coverage enhancement (e.g., a relatively small quantity of duplicates of a transmission) for a second wireless device with a relatively low level class of service (e.g., a network-connected parking meter). In another example, the network device may determine that a third wireless device is not to utilize the coverage enhancement mode based on the third wireless device being associated with a class of service lower than the class of service of the second wireless device.

Additionally, or alternatively, the network device may determine the level of coverage enhancement for the one or more wireless devices based on determining a network measurement associated with the one or more wireless devices. For example, the network device may receive information identifying a set of measurements associated with the one or more wireless devices, such as a set of signal strength measurements, a set of reference signal received power (RSRP) measurements, a set of reference signal received quality (RSRQ) measurements, a set of received signal code power (RSCP) measurement, a set of bit error rate (BER) measurements, or the like. In this case, the network device may determine the level of coverage enhancement for each wireless device based on the set of measurements.

Additionally, or alternatively, the network device may determine the level of coverage enhancement for the one or more wireless devices based on another metric, such as a quantity of wireless devices connected to the base station, an amount of network traffic being received by the base station, or the like. For example, when the amount of network traffic satisfies a congestion threshold, the network device may determine a relatively low level of coverage enhancement to reduce a utilization of processing resources by the base station (e.g., to process duplicate packets transmitted by the one or more wireless devices), thereby avoiding overloading the base station. Similarly, when the amount of network traffic does not satisfy the congestion threshold, the network device may determine a relatively high level of coverage enhancement to reduce a likelihood that a transmission fails to be correctly received by the base station.

As shown by reference number 120, based on determining the level of coverage enhancement for the coverage enhancement mode for the one or more wireless devices, the network device may provide information, to the one or more wireless devices, identifying the level of coverage enhancement for the coverage enhancement mode. For example, the network device may transmit information identifying a coverage enhancement parameter to cause the one or more wireless devices to utilize one or more determined levels of coverage enhancement. In this case, the coverage enhancement parameter may indicate a level of coverage enhancement, which may correspond to a particular quantity of duplicate packets to be transmitted.

As shown by reference number 130, based on receiving information identifying the level of coverage enhancement (e.g., the coverage enhancement parameter), the one or more wireless devices may activate the coverage enhancement mode and/or may utilize the level of coverage enhancement when transmitting network traffic. For example, a first wireless device may activate the coverage enhancement mode and transmit a relatively large quantity of copies of a packet (e.g., 10 copies, 100 copies, or 1000 copies) when utilizing a relatively high level of coverage enhancement. Similarly, a second wireless device may activate the coverage enhancement mode and may transmit a relatively small quantity of copies of a packet (e.g., 2 copies, 3 copies, or 4 copies) when utilizing a relatively low level of coverage enhancement.

As shown by reference number 140, the base station and/or network device may receive network traffic from the one or more wireless devices based on the one or more wireless devices utilizing the coverage enhancement mode. For example, the base station may receive multiple copies of a packet from a wireless device, and may cause a particular copy to be directed toward a destination device.

In this way, by centralizing the level of coverage enhancement for the one or more wireless devices rather than permitting the one or more wireless devices to perform a distributed determination of the level of coverage enhancement, the network device selectively prioritizes the network traffic, thereby improving the management of network traffic. Moreover, the wireless device reduces a likelihood of excess network congestion being caused and/or excess processing resources of the base station being utilized relative to permitting the one or more wireless devices to determine the level of coverage enhancement. Furthermore, the network device permits network resources to be allocated to the one or more wireless devices in the coverage area based on a prioritization of the one or more wireless devices, thereby improving network performance, wireless device performance, user experience, or the like relative to another technique for determining a level of coverage enhancement that does not account for the prioritization of the one or more wireless devices.

As indicated above, FIG. 1 is provided merely as an example. Other examples are possible and may differ from what was described with regard to FIG. 1.

Figure 2:
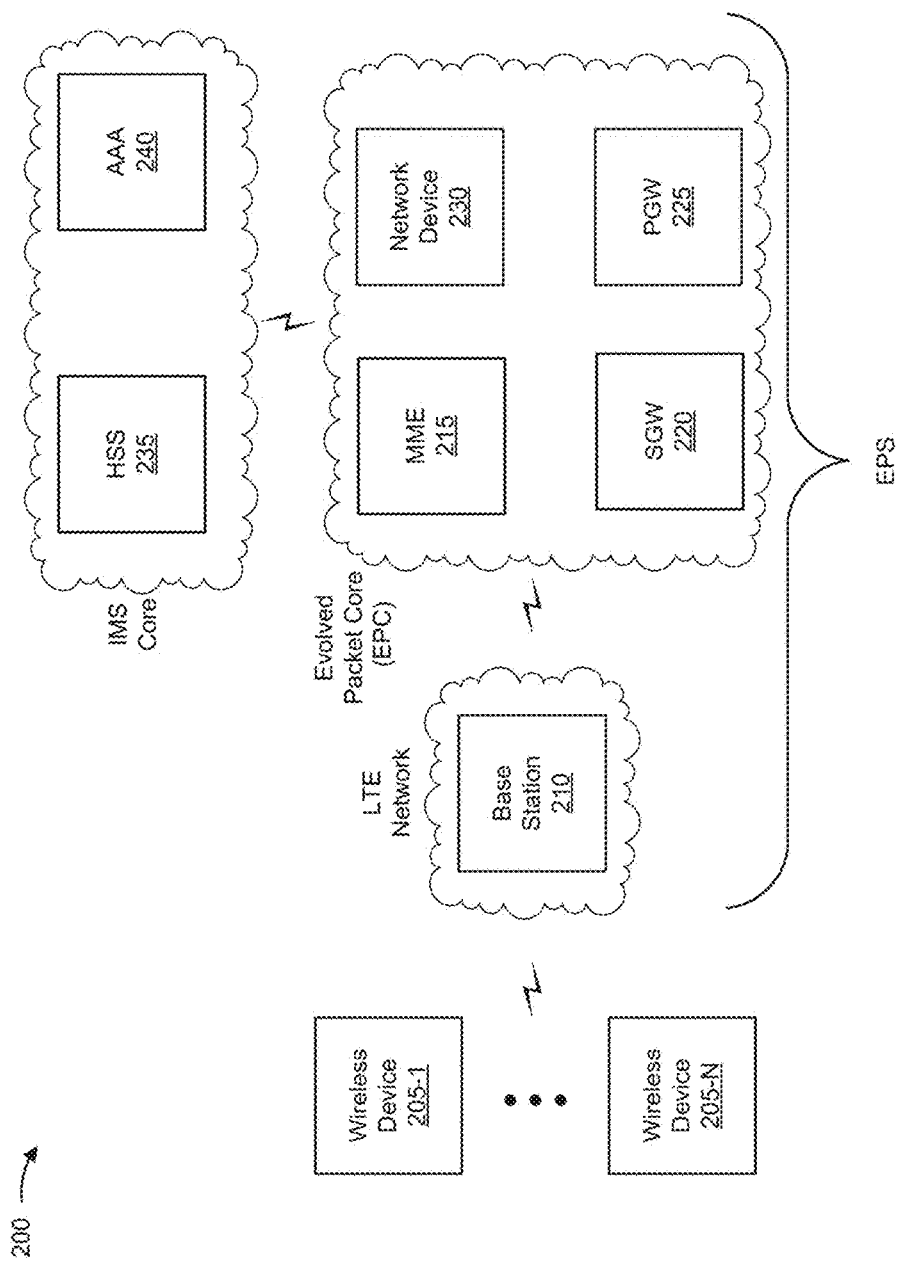
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more wireless devices 205-1 through 205-N (N≥1) (hereinafter referred to collectively as "wireless devices 205," and individually as "wireless device 205"); a base station 210; a mobility management entity device (MME) 215; a serving gateway (SGW) 220; a packet data network gateway (PGW) 225; a network device 230; a home subscriber server (HSS) 235; and an authentication, authorization, and accounting server (AAA) 240. Devices of environment 200 may interconnect via wired connections, wireless connections, or a combination of wired and wireless connections.

Some implementations are described herein as being performed within a long term evolution (LTE) network for explanatory purposes. Some implementations may be performed within an LTE network or another type of network, such as a third generation (3G) network, a fourth generation (4G) network, a fifth generation (5G) network, or the like.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which wireless device 205 communicates with the EPC. The EPC may include MME 215, SGW 220, PGW 225, and/or network device 230 that enable wireless device 205 to communicate with the network and/or an Internet protocol (IP) multimedia subsystem (IMS) core. The IMS core may include HSS 235 and/or AAA 240, and may manage device registration and authentication, session initiation, etc., associated with wireless devices 205. HSS 235 and/or AAA 240 may reside in the EPC and/or the IMS core.

Wireless devices 205 includes one or more devices capable of communicating with base station 210 and/or a network. For example, wireless device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. Additionally, or alternatively, wireless device 205 may include an Internet of Things (IoT) device, a machine device, a sensor device, a control device, or the like. Wireless device 205 may send traffic to and/or receive traffic from the network (e.g., via base station 210, SGW 220, and/or PGW 225). In some implementations, wireless device 205 may operate in one or more modes, such as a non-coverage enhancement mode (e.g., a mode where wireless device 205 is configured to transmit a single copy of each packet), a coverage enhancement mode (e.g., a mode where wireless device 205 is configured to transmit multiple copies of a set of packets), or the like.

Base station 210 includes one or more devices capable of transferring traffic, such as audio, video, text, and/or other traffic, destined for and/or received from wireless device 205. In some implementations, base station 210 may include an eNB associated with the LTE network that receives traffic from and/or sends traffic to the network via SGW 220 and/or PGW 225. Additionally, or alternatively, one or more base stations 210 may be associated with a RAN that is not associated with the LTE network. Base station 210 may send traffic to and/or receive traffic from wireless device 205 via an air interface. In some implementations, base station 210 may include a small cell base station, such as a base station of a microcell, a picocell, and/or a femtocell.

MME 215 includes one or more devices, such as one or more server devices, capable of managing authentication, activation, deactivation, and/or mobility functions associated with wireless device 205. In some implementations, MME 215 may perform operations relating to authentication of wireless device 205. Additionally, or alternatively, MME 215 may facilitate the selection of a particular SGW 220 and/or a particular PGW 225 to serve traffic to and/or from wireless device 205. MME 215 may perform operations associated with handing off wireless device 205 from a first base station 210 to a second base station 210 when wireless device 205 is transitioning from a first cell associated with the first base station 210 to a second cell associated with the second base station 210. Additionally, or alternatively, MME 215 may determine another MME (not pictured), to which wireless device 205 should be handed off (e.g., when wireless device 205 moves out of range of MME 215).

SGW 220 includes one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to the network (e.g., via PGW 225) and/or other network devices associated with the EPC and/or the IMS core. SGW 220 may also receive traffic from the network and/or other network devices, and may send the received traffic to wireless device 205 via base station 210. Additionally, or alternatively, SGW 220 may perform operations associated with handing off wireless device 205 to and/or from an LTE network.

PGW 225 includes one or more devices capable of providing connectivity for wireless device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to the network. Additionally, or alternatively, PGW 225 may receive traffic from the network, and may send the traffic to wireless device 205 via SGW 220 and base station 210. PGW 225 may record data usage information (e.g., byte usage), and may provide the data usage information to AAA 240.

Network device 230 includes one or more devices capable of receiving, generating, storing, processing, and/or providing information associated with a coverage enhancement mode of wireless device 205. For example, network device 230 may include a server device that determines a level of coverage enhancement for wireless device 205 and causes wireless devices 205 to utilize the level of coverage enhancement. In some implementations, network device 230 may provide credential information associated with configuring the level of coverage enhancement (e.g., a device identifier, a user identifier, or the like). While shown as being implemented within the EPC, in some implementations, network device 230 may be implemented external to the EPC. For example, network device 230 may be implemented with the LTE network (e.g., within base station 210) and/or within the IMS core. Additionally, or alternatively, network device 230 may be implemented within one or more other devices shown in FIG. 2, such as base station 210, MME 215, SGW 220, PGW 225, HSS 235, and/or AAA 240.

HSS 235 includes one or more devices, such as one or more server devices, capable of managing (e.g., receiving, generating, storing, processing, and/or providing) information associated with wireless device 205. For example, HSS 235 may manage subscription information associated with wireless device 205, such as information that identifies a subscriber profile of a user associated with wireless device 205, information that identifies services and/or applications that are accessible to wireless device 205, location information associated with wireless device 205, a network identifier (e.g., a network address) that identifies wireless device 205, information that identifies a treatment of wireless device 205 (e.g., quality of service information, a quantity of minutes allowed per time period, a quantity of data consumption allowed per time period, etc.), and/or similar information. HSS 235 may provide this information to one or more other devices of environment 200 to support the operations performed by those devices.

AAA 240 includes one or more devices, such as one or more server devices, that perform authentication, authorization, and/or accounting operations for communication sessions associated with wireless device 205. For example, AAA 240 may perform authentication operations for wireless device 205 and/or a user of wireless device 205 (e.g., using one or more credentials), may control access, by wireless device 205, to a service and/or an application (e.g., based on one or more restrictions, such as time-of-day restrictions, location restrictions, single or multiple access restrictions, read/write restrictions, etc.), may track resources consumed by wireless device 205 (e.g., a quantity of voice minutes consumed, a quantity of data consumed, etc.), and/or may perform similar operations.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
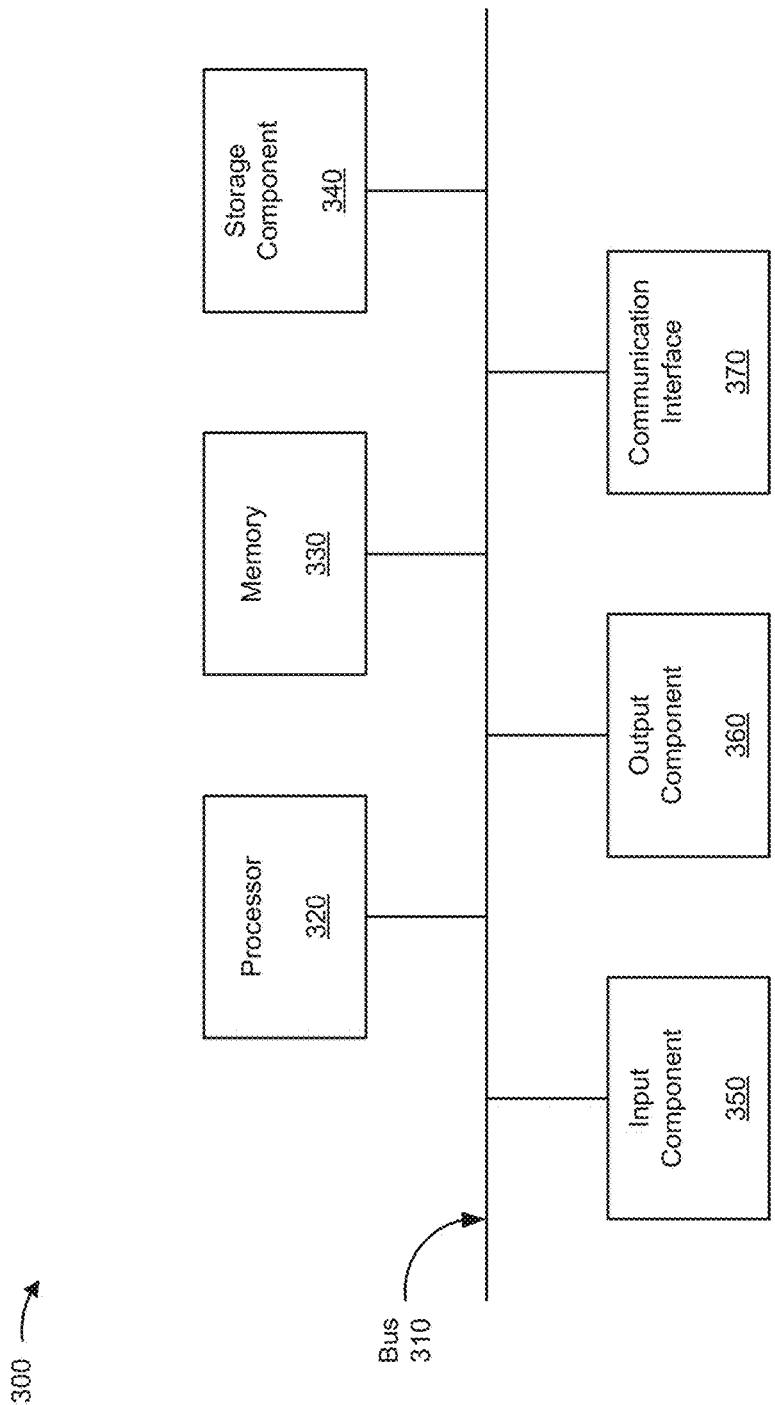
FIG. 3 is a diagram of example components of one or more devices of FIG. 2.

FIG. 3 is a diagram of example components of a device 300. Device 300 may correspond to wireless device 205, base station 210, MME 215, SGW 220, PGW 225, network device 230, HSS 235, and/or AAA 240. In some implementations, wireless device 205, base station 210, MME 215, SGW 220, PGW 225, network device 230, HSS 235, and/or AAA 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for configuring a coverage enhancement mode for a wireless device. In some implementations, one or more process blocks of FIG. 4 may be performed by network device 230. In some implementations, one or more process blocks of FIG. 4 may be performed by another device or a group of devices separate from or including network device 230, such as base station 210, MME 215, SGW 220, PGW 225, HSS 235, and/or AAA 240.

As shown in FIG. 4, process 400 may include detecting a trigger to configure a coverage enhancement mode for a wireless device (block 410). For example, network device 230 may detect the trigger to configure the coverage enhancement mode. In some implementations, network device 230 may detect the trigger to configure the coverage enhancement mode based on receiving information indicating that transmitted network traffic was not properly received. For example, network device 230 may receive information from wireless device 205, base station 210, or the like indicating that one or more transmitted packets were not received, and may determine that a level of coverage enhancement is to be determined for wireless device 205. For example, network device 230 may receive an indication that base station 210 failed to receive a threshold quantity of packets transmitted by wireless device 205, and/or that wireless device 205 failed to receive a threshold quantity of packets transmitted by base station 210.

In some implementations, network device 230 may detect the trigger to configure the coverage enhancement mode based on detecting a threshold amount of network traffic associated with base station 210. For example, when network device 230 detects that the quantity of network traffic satisfies a threshold, network device 230 may configure the coverage enhancement mode of one or more wireless devices 205 in a coverage area of base station 210 to reduce the quantity of transmitted packet duplicates. In this way, network device 230 may reduce network congestion, may reduce a utilization of computing resources by base station 210, or the like. Additionally, or alternatively, network device 230 may be triggered to configure the coverage enhancement mode based on determining that a threshold quantity of wireless devices 205 are associated with the coverage area of base station 210 (e.g., that a threshold quantity of wireless devices 205 are within the coverage area, are served by base station 210, or the like).

In some implementations, network device 230 may detect the trigger to configure the coverage enhancement mode based on information identifying a network measurement received from and/or measured by wireless device 205. For example, when network device 230 receives information indicating that a signal strength, measured by wireless device 205, satisfies a threshold (e.g., a detected received signal strength or a determined transmission signal strength), network device 230 may determine to configure the coverage enhancement mode. Additionally, or alternatively, network device 230 may configure the coverage enhancement mode based on receiving information indicating a threshold quantity of ineffective attempts for connectivity between wireless device 205 and network device 230.

In some implementations, network device 230 may detect the trigger to configure the coverage enhancement mode based on detecting user input provided to network device 230. For example, when network device 230 detects the user input, such as input that indicates a natural disaster in one or more coverage areas, an abnormal network traffic event in one or more coverage areas (e.g., a sports event or a parade), or the like, network device 230 may be triggered to configure the coverage enhancement mode for the one or more coverage areas.

In some implementations, network device 230 may detect the trigger to configure the coverage enhancement mode based on determining that wireless device 205 has connected to a network associated with network device 230. For example, when network device 230 determines that wireless device 205 has entered a coverage area of base station 210, network device 230 may be triggered to configure the coverage enhancement mode for wireless device 205.

In some implementations, network device 230 may detect the trigger to configure the coverage enhancement mode based on determining that wireless device 205 has transferred from a first coverage area to a second coverage area. For example, network device 230 may determine that wireless device 205 has transferred from a first coverage area associated with a first base station 210 to a second coverage area associated with a second base station 210. In this case, network device 230 may configure the coverage enhancement mode to alter the level of coverage enhancement of wireless device 205 from a first level of coverage enhancement associated with the first coverage area to a second level of coverage enhancement associated with the second coverage area.

As further shown in FIG. 4, process 400 may include determining priority information associated with one or more wireless devices 205 connected to a network based on detecting the trigger to configure the coverage enhancement mode (block 420). For example, network device 230 may determine priority information, associated with one or more wireless devices 205 connected to the network, based on detecting the trigger to configure the coverage enhancement mode for the one or more wireless devices 205. The priority information may include, for example, information identifying a class of service for the one or more wireless devices 205, a set of network measurements associated with the one or more wireless devices 205, or the like.

In some implementations, network device 230 may determine the class of service for the one or more wireless devices 205 based on detecting the trigger to configure the coverage enhancement mode for the one or more wireless devices 205. For example, based on detecting the trigger, network device 230 may request subscriber information regarding the one or more wireless devices 205 (e.g., from HSS 235), and may receive information identifying the subscriber information for the one or more wireless devices 205. The subscriber information may indicate a class of server for wireless device 205. Additionally, or alternatively, network device 230 may obtain stored subscriber information from a data structure of network device 230, based on querying the one or more wireless devices 205, or the like.

In some implementations, network device 230 may determine a set of network measurements regarding the one or more wireless devices 205 based on detecting the trigger to configure the coverage enhancement mode for the one or more wireless devices. For example, network device 230 may transmit, to the one or more wireless devices 205, a network measurement request, and may receive information identifying a signal strength measurement, an RSRP measurement, an RSRQ measurement, a BER measurement, or the like from the one or more wireless devices 205. In this case, network device 230 may cause wireless device 205 to perform a new measurement, to obtain stored information identifying a previously performed measurement, or the like.

As further shown in FIG. 4, process 400 may include determining a level of coverage enhancement based on determining the priority information (block 430). For example, network device 230 may determine the level of coverage enhancement for the one or more wireless devices 205 based on determining the priority information associated with the one or more wireless devices 205 connected to the network.

In some implementations, network device 230 may determine the level of coverage enhancement based on subscriber information for the one or more wireless devices 205. For example, network device 230 may determine one or more levels of coverage enhancement, which correspond to one or more classes of service assigned to the one or more wireless devices 205, for one or more wireless devices 205.

In some implementations, network device 230 may determine the level of coverage enhancement based on determining one or more network measurements associated with the one or more wireless devices 205. For example, network device 230 may receive information indicating a first threshold signal strength for a first wireless device 205 and a second threshold signal strength for a second wireless device 205. In this case, network device 230 may determine a first level of coverage enhancement for the first wireless device 205 and a second level of coverage enhancement for the second wireless device 205.

In some implementations, network device 230 may determine the level of coverage enhancement based on one or more other metrics associated with the network. For example, network device 230 may determine the level of coverage enhancement based on a quantity of wireless devices 205 connected to the network. In this case, when the quantity of wireless devices 205 satisfies a threshold, network device 230 may determine a relatively low level of coverage enhancement to reduce network congestion and utilization of computing resources by base station 210. Conversely, network device 230 may determine a relatively high level of coverage enhancement to increase a likelihood of a successful transmission when the quantity of wireless devices 205 connected to the network fails to satisfy a threshold. Similarly, network device 230 may determine the level of coverage enhancement based on a level of network congestion, an amount of network traffic, a utilization of processing resources of base station 210, or the like.

In some implementations, network device 230 may determine the level of coverage enhancement based on the prioritization of the one or more wireless devices 205. For example, when a level of network traffic satisfies a congestion threshold and a signal strength reported by one or more wireless devices 205 satisfies a signal strength threshold, network device 230 may provide a high level of coverage enhancement to wireless devices 205 with a high class of service (e.g., emergency management devices) and a relatively low level of coverage enhancement to other wireless devices 205 (e.g., non-emergency related devices). In this case, network device 230 reduces a likelihood that the packets of data from the one or more wireless devices 205 that are associated with responding to an emergency will fail to be received. Moreover, network device 230 selectively prioritizes the network traffic, improving the management of network traffic, and reduces a likelihood of excess network congestion relative to permitting each wireless device 205 to independently determine a high level of coverage enhancement based on a relatively poor signal strength. In some implementations, network device 230 may allocate a set of network resources based on a prioritization of the one or more wireless devices 205.

In some implementations, network device 230 may determine the level of coverage enhancement based on an available battery capacity of one or more wireless devices 205. For example, based on receiving information indicating that a particular wireless device 205 is associated with a battery capacity failing to satisfy a threshold, network device 230 may select a level of coverage enhancement for one or more wireless devices 205 to reduce a utilization of battery resources of the particular wireless device 205. In this way, network device 230 reduces a likelihood that wireless device 205 will shut down as a result of a lack of battery resources relative to another technique where coverage enhancement is not selected to maximize battery resources.

Although implementations are described herein in terms of relatively low coverage enhancement levels and relatively high coverage enhancement levels, other levels of coverage enhancement are possible, such as a continuous set of coverage enhancement levels, a discrete set of coverage enhancement levels, or the like.

As further shown in FIG. 4, process 400 may include providing information to cause the level of coverage enhancement to be implemented (block 440). For example, network device 230 may provide information, to a particular wireless device 205, to cause the level of coverage enhancement to be implemented by the particular wireless device 205. In this case, network device 230 causes wireless device 205 to transmit subsequent network traffic utilizing the level of coverage enhancement (e.g., a particular quantity of copies of one or more packets that are transmitted).

In some implementations, network device 230 may transmit information (e.g., an instruction) to cause wireless device 205 to activate the coverage enhancement mode and utilize a particular level of coverage enhancement. For example, when wireless device 205 is operating in a connected mode, a non-coverage enhancement mode, an idle mode, or the like, network device 230 may cause wireless device 205 to activate the coverage enhancement mode, and transmit network traffic using the coverage enhancement mode. In some implementations, network device 230 may transmit information to cause the coverage enhancement mode to remain at a static level. For example, wireless device 205 may perform a signal strength measurement and may determine that the signal strength measurement satisfies a threshold associated with a different level of coverage enhancement than the level of coverage enhancement identified by network device 230. In this case, wireless device 205 may be caused to utilize the level of coverage enhancement identified by network device 230 rather than the different level of coverage enhancement corresponding to the signal strength measurement. In this way, network device 230 ensures that wireless device 205 utilizes a level of coverage enhancement that does not cause excess network traffic.

In some implementations, network device 230 may store information identifying the level of coverage enhancement to cause wireless device 205 to utilize the level of coverage enhancement. For example, network device 230 may store information via a subscriber profile, associated with wireless device 205, that identifies the level of coverage enhancement. In this case, wireless device 205 may be caused to utilize the level of coverage enhancement identified by the information stored via the subscriber profile stored by network device 230 or another device. Additionally, or alternatively, based on obtaining information identifying a group of wireless devices 205 in a particular coverage area, network device 230 may store information via a group of corresponding subscriber profiles for the group of wireless devices 205 to cause the group of wireless devices 205 to utilize the determined level of coverage enhancement. Additionally, or alternatively, network device 230 may store information via a set of subscriber profiles to set a level of coverage enhancement for a set of wireless devices 205 associated with multiple coverage areas.

In this way, by centralizing the level of coverage enhancement for one or more wireless devices 205 rather than permitting the one or more wireless devices 205 to perform a distributed determination of the level of coverage enhancement, network device 230 improves the management of network traffic. Moreover, wireless device 205 reduces a likelihood of excess network congestion being caused and/or excess processing resources of base station 210 being utilized relative to permitting one or more wireless devices 205 to determine the level of coverage enhancement. Furthermore, network device 230 permits network resources to be allocated to one or more wireless devices 205 in the coverage area based on a prioritization of one or more wireless devices 205, thereby improving network performance, wireless device performance, user experience, or the like relative to another technique for determining a level of coverage enhancement that does not account for the prioritization of one or more wireless devices 205.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
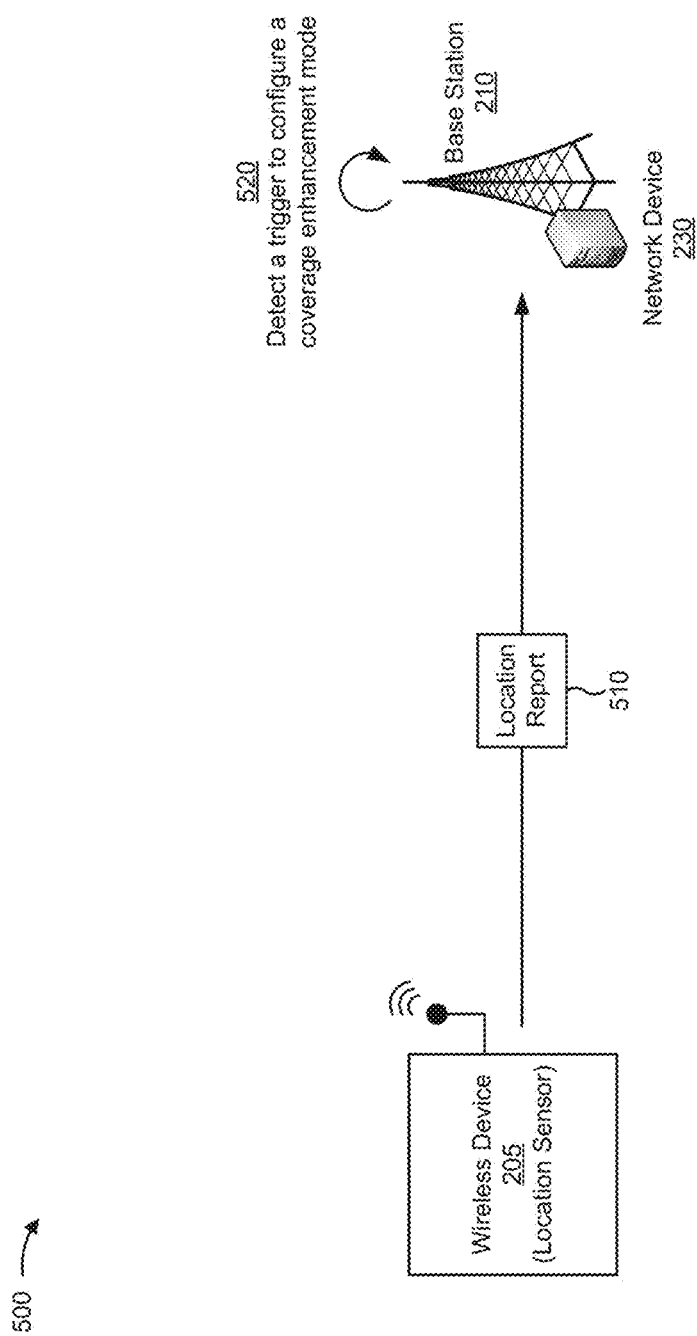
Figure 5B:
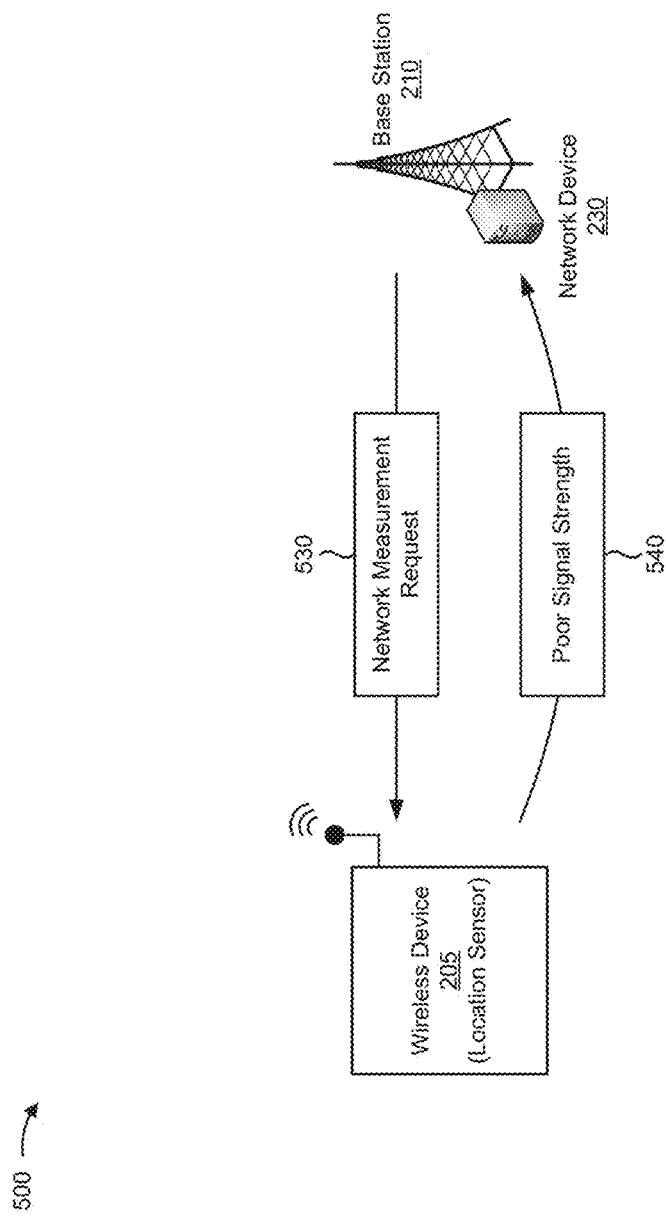

FIGS. 5A-5C are diagrams of an example implementation 500 relating to example process 400 shown in FIG. 4. FIGS.

5A-5C show an example of configuring a coverage enhancement mode for a wireless device.

As shown in FIG. 5A, base station 210 receives a location report 510 from wireless device 205 (e.g., a location sensor). For example, based on wireless device 205 performing a location determination, wireless device 205 may transmit information associated with the location determination (e.g., a single packet encapsulating location report 510) to a destination device via base station 210. As shown by reference number 520, after transmitting the packet, network device 230 detects a trigger to configure a coverage enhancement mode. For example, network device 230 may receive information indicating that a threshold quantity of wireless devices 205 are connected to base station 210, which may trigger network device 230 to configure the coverage enhancement mode.

As shown in FIG. 5B, and by reference number 530, based on detecting the trigger to configure the coverage enhancement mode, network device 230 transmits a network measurement request to wireless device 205. The network measurement request causes wireless device 205 to perform a signal strength measurement. As shown by reference number 540, network device 230 receives, from wireless device 205, information indicating that wireless device 205 measured a relatively poor signal strength from base station 210.

As shown in FIG. 5C, and by reference number 550, network device 230 determines a level of coverage enhancement based on the network measurement. For example, based on receiving information indicating that wireless device 205 has relatively poor signal strength, and based on a quantity of wireless devices 205 connected to base station 210, network device 230 may determine that wireless device 205 is to utilize a relatively high level of coverage enhancement (e.g., assigning wireless device 205 a coverage enhancement parameter value of 3/3 on a particular scale). As shown by reference 560, network device 230 transmits, to wireless device 205, information indicating that wireless device 205 is to utilize the relatively high level of coverage enhancement. As shown by reference number 570, based on wireless device 205 implementing a relatively high level of coverage enhancement, wireless device 205 transmits multiple copies of a location report 570, thereby reducing a likelihood that the location report will fail to be received by base station 210.

As indicated above, FIGS. 5A-5C are provided merely as an example. Other examples are possible and may differ from what was described with regard to FIGS. 5A-5C.

Figure 6A:
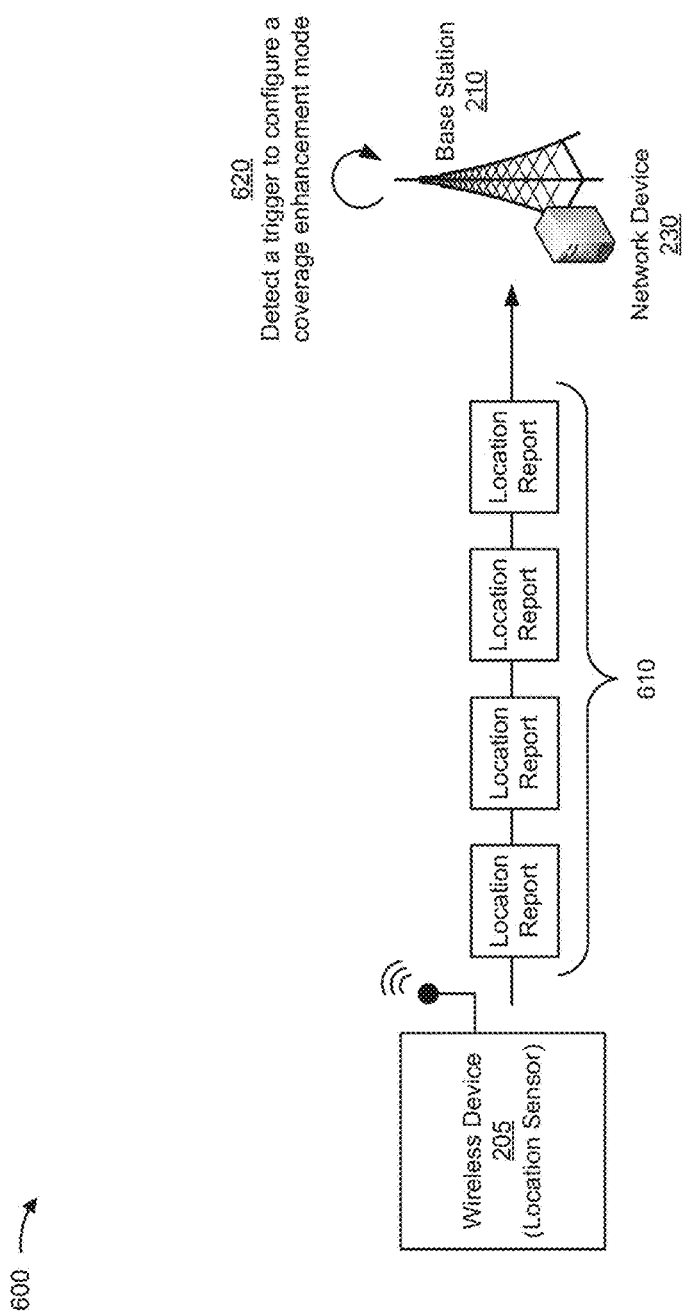
FIGS. 6A-6C are diagrams of another example implementation relating to the example process shown in FIG. 4.
Figure 6B:
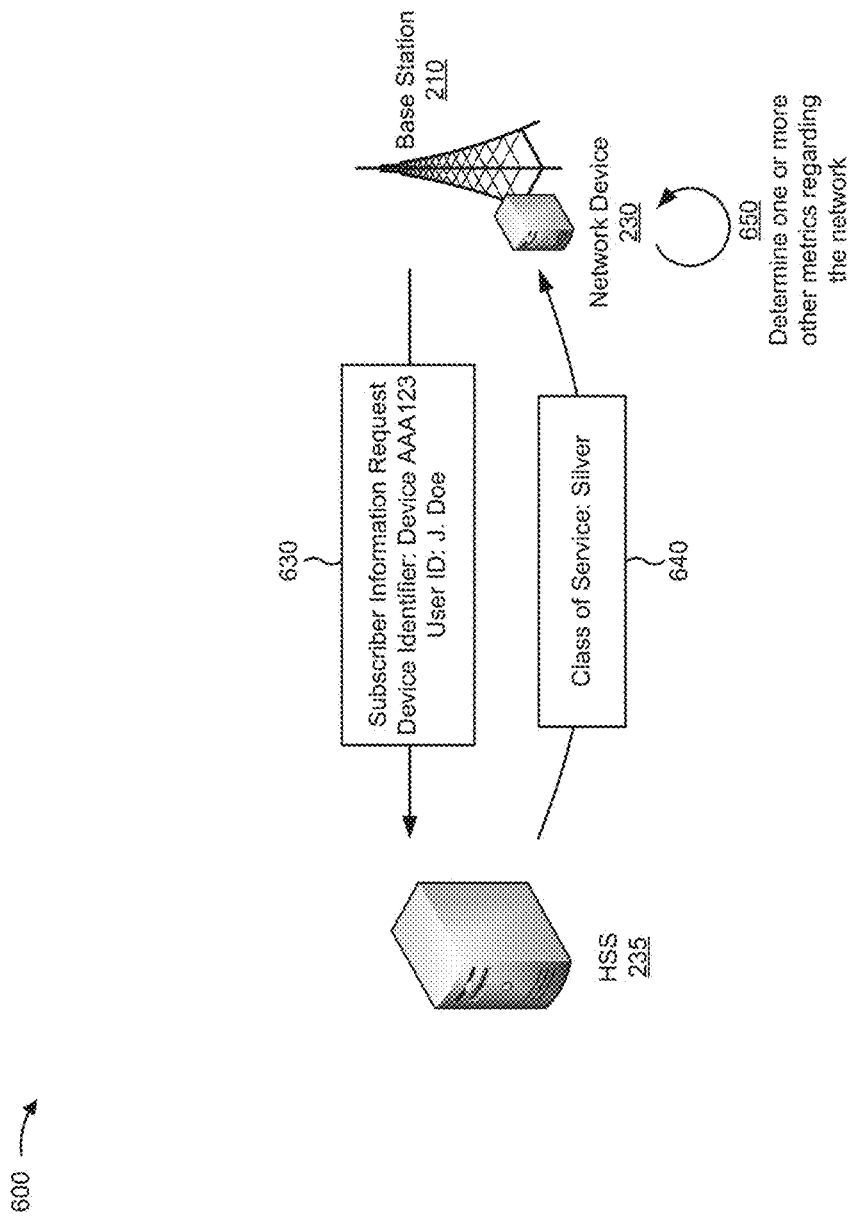
Figure 6C:
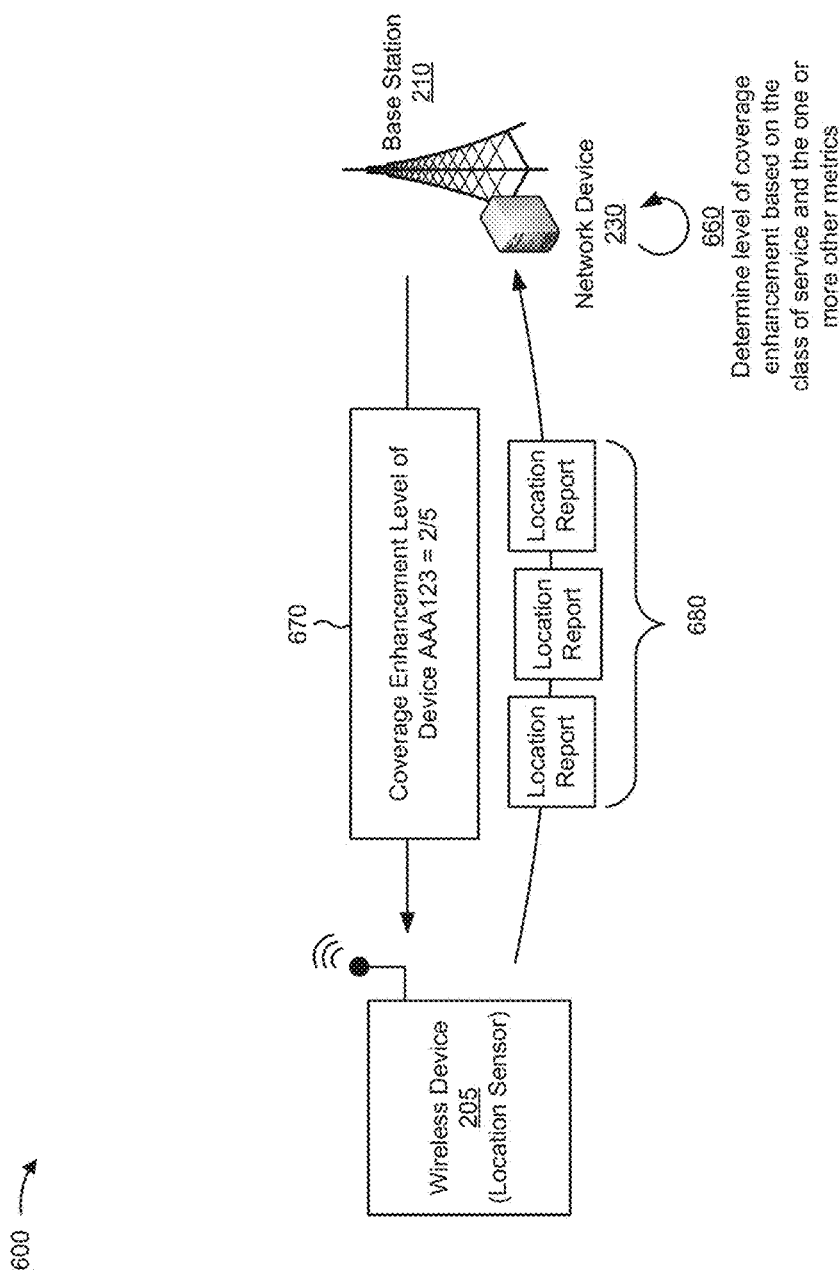

FIGS. 6A-6C are diagrams of an example implementation 600 relating to example process 400 shown in FIG. 4. FIGS. 6A-6C show an example of configuring a coverage enhancement mode for a wireless device 205.

As shown in FIG. 6A, base station 210 receives multiple copies of location report 610 (e.g., one or more packets) from wireless device 205. As shown by reference number 620, after location report 610 is transmitted, network device 230 detects a trigger to configure a coverage enhancement mode, such as by determining that a level of network traffic satisfies a threshold, determining that an RSRP measurement associated with the network satisfies an RSRP measurement threshold, or the like.

As shown in FIG. 6B, and by reference number 630, based on detecting the trigger to configure the coverage enhancement mode, network device 230 transmits a subscriber information request, regarding wireless device 205, to HSS 235. The subscriber information request may include information identifying wireless device 205 (e.g., Device AAA123) and a user identifier (e.g., J. Doe) associated with wireless device 205. As shown by reference number 640, network device 230 receives information identifying the class of service for wireless device 205 (e.g., a class of service of silver on a particular scale indicating a relatively low class of service). As shown by reference number 650, network device 230 determines information identifying one or more other metrics regarding the network, such as a quantity of wireless devices 205 utilizing the network, a signal quality associated with the network, a set of classes of service for a set of other wireless device 205, or the like.

As shown in FIG. 6C, and by reference number 660, network device 230 determines a level of coverage enhancement based on the class of service and the one or more other metrics regarding the network. For example, based on receiving information indicating that the class of service associated with wireless device 205 is relatively low and based on the one or more other metrics indicating that an amount of network traffic satisfies a threshold, network device 230 may determine that wireless device 205 is to utilize a relatively low level of coverage enhancement. As shown by reference 670, network device 230 transmits an instruction to wireless device 205 indicating that wireless device 205 is to utilize the relatively low level of coverage enhancement.

As further shown in FIG. 6C, based on wireless device 205 implementing a relatively low level of coverage enhancement, wireless device 205 transmits fewer copies of location report 680 relative to a quantity of copies of location report 570 provided by wireless device 205 when utilizing a relatively high level of coverage enhancement, as shown in FIG. 5C. In this way, network device 230 reduces an amount of network congestion relative to permitting wireless device 205 to utilize a higher level of coverage enhancement, thereby improving network performance.

As indicated above, FIGS. 6A-6C are provided merely as an example. Other examples are possible and may differ from what was described with regard to FIGS. 6A-6C.

In this way, by centralizing the level of coverage enhancement for one or more wireless devices 205 rather than permitting the one or more wireless devices 205 to perform a distributed determination of the level of coverage enhancement, network device 230 improves the management of network traffic. Moreover, wireless device 205 reduces a likelihood of excess network congestion being caused and/or excess processing resources of base station 210 being utilized relative to permitting one or more wireless devices 205 to determine the level of coverage enhancement. Furthermore, network device 230 permits network resources to be allocated to one or more wireless devices 205 in the coverage area based on a prioritization of one or more wireless devices 205, thereby improving network performance, wireless device performance, user experience, or the like relative to another technique for determining a level of coverage enhancement that does not account for the prioritization of one or more wireless devices 205.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory; and
   one or more processors to:
   detect a trigger to configure a coverage enhancement mode for a wireless device, the wireless device being associated with a particular coverage area;
   determine information associated with one or more wireless devices connected to a network,
      the network being associated with the particular coverage area, and
      the information being associated with a level of network traffic of the network;
   determine a level of coverage enhancement for the wireless device based on the information; and
   transmit an instruction to cause the wireless device to utilize the level of coverage enhancement for the coverage enhancement mode,
      the instruction identifying a quantity of copies of packets to be transmitted by the wireless device based on the level of coverage enhancement.

2. The device of claim 1, where the one or more processors are further to:
   receive an indication that transmitted network traffic was not received; and
   where the one or more processors, when detecting the trigger to configure the coverage enhancement mode, are to:
      detect the trigger to configure the coverage enhancement mode based on receiving the indication.

3. The device of claim 1, where the one or more processors are further to:
   receive an indication a base station failed to receive a threshold quantity of packets transmitted by the wireless device; and
   where the one or more processors, when detecting the trigger to configure the coverage enhancement mode, are to:
      detect the trigger to configure the coverage enhancement mode based on receiving the indication.

4. The device of claim 1, where the one or more processors are further to:
   detect a threshold quantity of network traffic associated with a base station; and
   where the one or more processors, when detecting the trigger to configure the coverage enhancement mode, are to:
      detect the trigger to configure the coverage enhancement mode based on detecting the threshold quantity of network traffic associated with the base station.

5. The device of claim 1, where the one or more processors are further to:
   determine that a network measurement, associated with the wireless device, satisfies a threshold; and
   where the one or more processors, when detecting the trigger to configure the coverage enhancement mode, are to:
      detect the trigger to configure the coverage enhancement mode based on determining that the network measurement satisfies the threshold.

6. The device of claim 1, where the one or more processors are further to:
   determine that the wireless device has transferred from the particular coverage area to another coverage area; and
   alter the level of coverage enhancement based on determining that the wireless device has transferred from the particular coverage area to the other coverage area.

7. The device of claim 1, where the one or more processors are further to:
   determine priority information associated with the one or more wireless devices based on detecting the trigger; and
   where the one or more processors, when determining the level of coverage enhancement for the wireless device, are to:
      determine, based on the priority information, the level of coverage enhancement for the wireless device.

8. A non-transitory computer-readable medium storing instructions, the instructions comprising:

one or more instructions that, when executed by one or more processors, cause the one or more processors to:
  detect a trigger to configure a coverage enhancement mode for a plurality of wireless devices,
    the plurality of wireless devices being associated with a particular coverage area;
  determine information associated with one or more wireless devices connected to a network,
    the network being associated with the particular coverage area, and
    the information being associated with a level of network traffic of the network;
  determine, based on the information associated with the one or more wireless devices connected to the network, a level of coverage enhancement that the plurality of wireless devices are to implement for the coverage enhancement mode; and
  instruct the plurality of wireless devices to transmit a quantity of copies of packets based on the level of coverage enhancement.

9. The non-transitory computer-readable medium of claim 8, where the one or more instructions, when executed by the one or more processors, further cause the one or more processors to:
  determine, based on detecting the trigger, a set of network measurements regarding the plurality of wireless devices; and
  where the one or more instructions, that cause the one or more processors to determine the level of coverage enhancement that the plurality of wireless devices are to implement for the coverage enhancement mode, cause the one or more processors to:
    determine, based on the set of network measurements, the level of coverage enhancement that the plurality of wireless devices are to implement for the coverage enhancement mode.

10. The non-transitory computer-readable medium of claim 8, where the one or more instructions, when executed by the one or more processors, further cause the one or more processors to:
  determine subscriber information for the plurality of wireless devices; and
  where the one or more instructions, that cause the one or more processors to determine the level of coverage enhancement that the plurality of wireless devices are to implement for the coverage enhancement mode, cause the one or more processors to:
    determine, based on the subscriber information, the level of coverage enhancement that the plurality of wireless devices are to implement for the coverage enhancement mode.

11. The non-transitory computer-readable medium of claim 8, where the one or more instructions, when executed by the one or more processors, further cause the one or more processors to:
  determine that one or more network measurements associated the plurality of wireless devices; and
  where the one or more instructions, that cause the one or more processors to determine the level of coverage enhancement that the plurality of wireless devices are to implement for the coverage enhancement mode, cause the one or more processors to:
    determine, based on the one or more network measurements, the level of coverage enhancement that the plurality of wireless devices are to implement for the coverage enhancement mode.

12. The non-transitory computer-readable medium of claim 8, where the one or more instructions, when executed by the one or more processors, further cause the one or more processors to:
  determine a quantity of wireless devices connected to the network; and
  where the one or more instructions, that cause the one or more processors to determine the level of coverage enhancement that the plurality of wireless devices are to implement for the coverage enhancement mode, cause the one or more processors to:
    determine, based on the quantity of wireless devices connected to the network, the level of coverage enhancement that the plurality of wireless devices are to implement for the coverage enhancement mode.

13. The non-transitory computer-readable medium of claim 8, where the one or more instructions, when executed by the one or more processors, further cause the one or more processors to:
  determine whether a quantity of wireless devices connected to the network satisfies a threshold; and
  where the one or more instructions, that cause the one or more processors to determine the level of coverage enhancement that the plurality of wireless devices are to implement for the coverage enhancement mode, cause the one or more processors to:
    determine, based on the quantity of wireless devices connected to the network satisfying the threshold, a first level of coverage enhancement that the plurality of wireless devices are to implement for the coverage enhancement mode; or
    determine, based on the quantity of wireless devices connected to the network not satisfying the threshold, a second level of coverage enhancement that the plurality of wireless devices are to implement for the coverage enhancement mode,
      the second level being higher than the first level.

14. The non-transitory computer-readable medium of claim 8, where the one or more instructions, when executed by the one or more processors, further cause the one or more processors to:
  determine a battery capacity of a wireless device of the plurality of wireless devices; and
  where the one or more instructions, that cause the one or more processors to determine the level of coverage enhancement that the plurality of wireless devices are to implement for the coverage enhancement mode, cause the one or more processors to:
    determine, based on the battery capacity satisfying a threshold, the level of coverage enhancement that the wireless device is to implement for the coverage enhancement mode.

15. A method, comprising:
  detecting, by a device, a trigger to configure a coverage enhancement mode for a wireless device,
    the wireless device being associated with a particular coverage area;
  determining, by the device, information associated with the wireless device and a set of other wireless devices connected to a network,
    the network being associated with the particular coverage area;
  determining, by the device, a particular level of coverage enhancement, of a set of levels of coverage enhancement, for the wireless device based on the information; and transmitting, by the device, a coverage enhancement level parameter identifying the particular level of coverage enhancement to cause the wireless device to utilize the particular level of coverage enhancement for the coverage enhancement mode when the wireless device is connected to the network, the coverage enhancement level parameter identifying a quantity of copies of packets to be transmitted by the wireless device based on the particular level of coverage enhancement.

16. The method of claim 15, further comprising:

performing a signal strength measurement; and where transmitting the coverage enhancement level parameter identifying the particular level of coverage enhancement comprises:

transmitting, based on the signal strength measurement satisfying a threshold, the coverage enhancement level parameter identifying the particular level of coverage enhancement.

17. The method of claim 15, further comprising:

receiving information indicating a threshold quantity of ineffective attempts for connectivity between the wireless device and the device; and configuring the coverage enhancement mode based on receiving the information indicating the threshold.

18. The method of claim 15, where determining the information associated with the wireless device and the set of other wireless devices connected to the network comprises:

obtaining, from a data structure, subscriber information for the wireless device, the subscriber information identifying a class of service for the wireless device; and where determining the particular level of coverage enhancement comprises:

determining the particular level of coverage enhancement based on the class of service for the wireless device.

19. The method of claim 15, where determining the information associated with the wireless device and the set of other wireless devices connected to the network comprises:

receiving information identifying a set of network measurements associated with the set of other wireless devices; and where determining the particular level of coverage enhancement comprises:

determining the particular level of coverage enhancement based on the information identifying the set of network measurements.

20. The method of claim 15, further comprising:

detecting user input; and where detecting the trigger comprises:

detecting the trigger based on the user input.

* * * * *